ELECTRICAL DATA HANDLING APPARATUS

Filed Sept. 30, 1957

INVENTOR.
JOHN L. MAC ARTHUR

BY Arthur H. Swanson

ATTORNEY.

United States Patent Office 3,010,094
Patented Nov. 21, 1961

3,010,094

ELECTRICAL DATA HANDLING APPARATUS

John L. MacArthur, Silver Spring, Md., assignor to Minneapolis-Honeywell Regulator Company, Minneapolis, Minn., a corporation of Delaware Filed Sept. 30, 1957, Ser. No. 687,077
6 Claims. (Cl. 340—172.5)

This invention relates to electronic apparatus, and more particularly to electric signal translating apparatus.

In the handling of signal information, it is frequent that the signal information occurs in the form of periodic or aperiodic signals interspersed with intervals of no signal. Further, it often happens that considerable noise disturbances will become apparent in the intervals. These noise signals would on many occasions, prove to be, at least, confusing if not descriptive of the signal translating system.

One instance of a signal translating system of this type may be a so-called pulse width modulation system. In data handling techniques popular today, data is stored in intermediate storage means such as on magnetic tape. When the data to be stored is a signal of the pulse width modulated type, it is convenient to develop a series of sharp pulses which will be indicative of the leading and trailing edges of the pulse width modulated pulses. These may, of course, be pulses which are alternately of opposite polarity. These pulses are then recorded on a magnetic record tape as being representative of the original pulse width modulated signals. On play-back, these pulses may be used to trigger a suitable gating device to reconstruct a series of signals which are consistant with the original signals. One difficulty arises in such systems because on play-back, the sharp pulses, either positive or negative, are inherently differentiated, producing double peaked pulses, that is pulses having both a positive and a negative peak. These double peaked pulses will, of course, be phased oppositely with respect to each other, depending upon whether the differentiated signal was positive or negative.

The point where these double peaked pulses cross the zero axis is used as the index at which time the gating device is to be triggered. If these cross-over points are not sharply defined, difficulty is experienced in accurately triggering the gating device. To assure a sharp definition of the cross-over point the play-back signal is passed through a high-gain limiting amplifier. This, unfortunately, amplifies the noise pulses intermediate the desired pulses to a point where they, too, could cause a spurious triggering of the gating device.

It is, accordingly, an object of this invention to provide improved means for and method of effectively suppressing noise in a signal translating system.

It is a further object of this invention to provide an improved data handling circuit wherein undesired noise effects are suppressed.

It is another object of this invention to provide an improved data handling circuit of the pulse width modulation type wherein means are provided for preventing spurious noise from producing erroneous output indications.

In accomplishing these and other objects, there has been provided, in accordance with the present invention, a data handling circuit wherein a high frequency oscillatory signal is super-imposed upon a series of spaced data pulse signals. The mixed signals are then amplified and clipped. The clipped signals are fed through a suitable circuit to remove, in effect at least, the superimposed component of the signal, leaving the data pulse signals which may then be used in the subsequent circuitry.

A better understanding of this invention may be had from the following detailed description when read in connection with the accompanying drawing in which.

Figure 1:
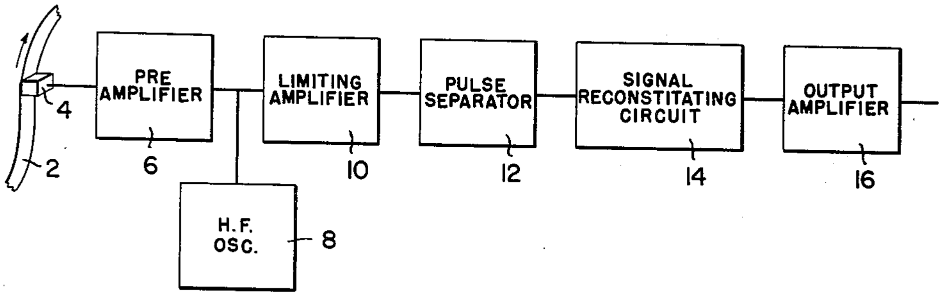
FIG. 1 is a schematic diagram of apparatus embodying the present invention.

Referring now to the drawing in more detail, there is shown a portion of a data handling system incorporating the principles of the present invention. As was previously mentioned, it is not uncommon to find, in data handling systems, information encoded as variable width pulses such as shown in line *a* of FIG. 2. When it is desired to store this type of data on a temporary or permanent record means such as a magnetic member, tape, disc, or drum; the information code is converted to a train of spaced sharp pulse peaks or pips indicative of the leading and trailing edges of the original data pulse. These pips will be alternately oppositely directed to distinguish, respectively, between the leading and trailing edges of the data pulses. A series of such pips are illustrated in line *b* of FIG. 2. It is these pips which are recorded on the storage member, which storage member will be hereinafter referred to as magnetic tape.

Figure 2:
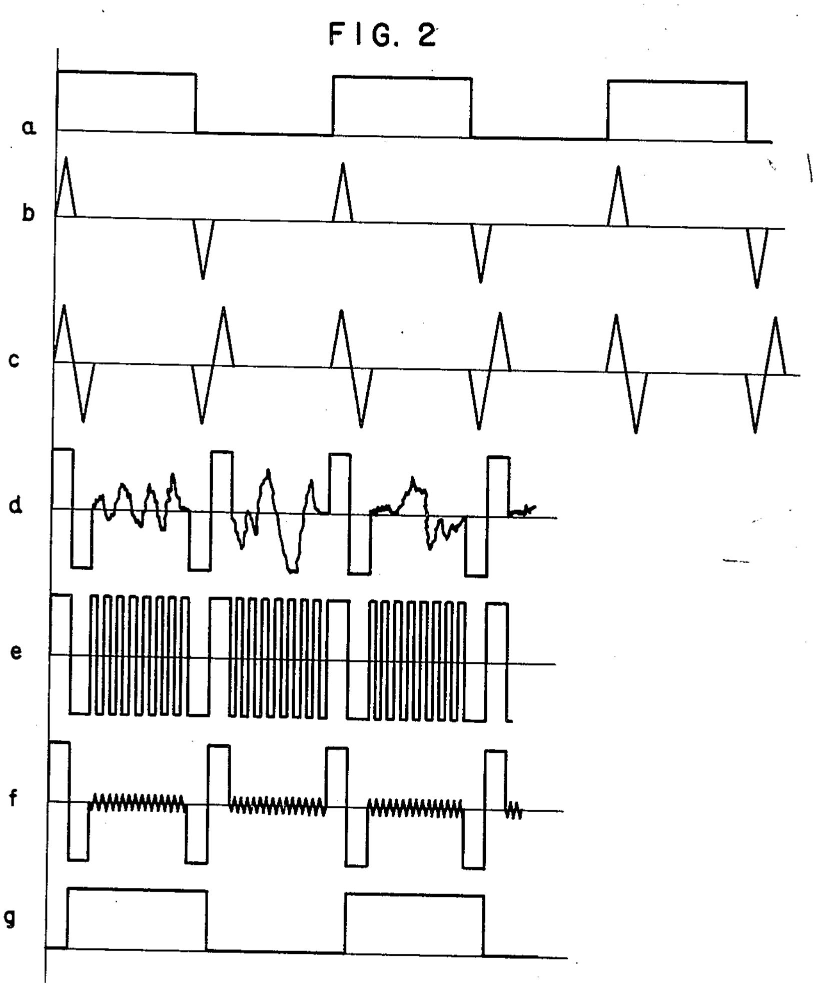
FIG. 2 is a group of curves representative of signal characteristics to be used in the explanation of this invention.

As is well understood, when signal pips of the type shown at line *b* of FIG. 2 are played back from a magnetic tape record, the inherent differentiating effect of magnetic reproducers results in a series of pulses each of which has a positive and a negative portion as shown at line *c* of FIG. 2. In reconstructing the original data pulse from these signals, the center portion or cross-over is utilized to trigger a suitable gating circuit. Due to the inherent irregularities in the tape play-back system, such, for example, as variations in the amplitude of the played-back signals, the cross-over of the signal is not sharply defined. With these signals not sharply defined the triggering of the gating or reconstructing circuit may vary objectionably, particularly in the case of pulse width modulated signals. To effect a sharper definition of the cross-over, the bidirectional pips are greatly amplified and clipped.

Unfortunately, when signals interspersed with intervals of no signal are applied to a high gain clipping or limiting amplifier, the output of the amplifier includes, in the no signal intervals, a large noise component. These noise components may, at times, be of sufficient amplitude to trigger the reconstructing circuit. Such an occurrence would, of course, result in an erroneous output signal. The present invention provides means for preventing such occurrences.

Referring now to FIG. 1, there is shown a portion of a magnetic record tape 2. This portion 2 is, of course, merely representative of substantial length of such tape which is driven, by means not shown but well known in the art, in the direction indicated by the adjacent arrow. A suitable magnetic record transducer 4 is positioned to engage the tape 2, to be energized by the magnetic signals thereon. The signals developed in the transducer 4 are fed to a preamplifier 6 and take the form of the bidirectional pips shown at line *c* of FIG. 2. There is provided a high-frequency oscillator 8, the output of which is superimposed upon the output of the preamplifier 6. The high frequency oscillations fill the interval between the pips representative of the data pulses. Also the oscillations will be superimposed on the peaks of these pips. These mixed signals are then fed to a high-gain clipping or limiting amplifier 10. Here the mixed signals are amplified and clipped to produce a signal train as represented at line *e* of FIG. 2. With the high frequency signals filling the interval between pips, there is not a nosignal period which would have given rise to the otherwise anticipated high noise level at the output of the high gain amplifier 10. Further, such noise as might be present would appear as the envelope of the high frequency signals, and would be clipped off by the clipping function of the amplifier. Such of the high frequency signals as were superimposed on the peaks of the pips would also be clipped off by the clipping function of the amplifier 10. The high-gain amplification of the pips produces the sharp delineation of the pulse cross-over that was indicated as being desirable.

The output of the amplifier 10 is then fed to a suitable pulse separating means 12. Such means may comprise no more than a relatively simple low-pass filter. On the other hand, it may take the form of a differentiator of suitable time constant such that only the pulse peaks reach a predetermined level below which the signals are clipped. Then, too, it may be that the clipping amplifier has a plurality of stages at least part of which are of narrow bandwidth and will thereby attenuate the oscillatory signals while amplifying and clipping the pulse pips. Irrespective of which technique is employed, the high frequency signals are effectively removed from the train of pips. Assuming, for the moment that a low-pass filter were to be used, or the attenuating effect of narrow bandwidth stages of clipping amplifiers employed, the output of the pulse separating means may be represented as shown at line *f* of FIG. 2.

The output signals from the pulse separator 12 are then fed to the input of a pulse reconstituting circuit 14. This pulse reconstituting circuit may comprise any suitable gating device such, for example, as an Eccles-Jordan circuit. In the case of the employment of an Eccles-Jordan circuit, the signals of line *f* of FIG. 2 would be fed first to a differentiator and phase inverter to produce the proper type of trigger pulses to actuate the Eccles-Jordan circuit. These elements would, of course constitute a part of the signal reconstituting circuit.

After the pulses have been reconstituted, as illustrated at line *g* of FIG. 2, the signals are applied to be amplified in an output amplifier 16. The output amplifier 16 may suitably be a cathode follower amplifier. The output of this amplifier may then be applied as input to any suitable or desired utilization apparatus.

Thus it may be seen that there has been provided, in accordance with the present invention, an improved signal translating arrangement for data handling systems which is characterized in that unwanted noise occurring in the interval between spaced pulses is effectively eliminated.

What is claimed is:

1. In a data handling system of the type wherein data is encoded as pulse width modulated signals and recorded as a train of spaced pulse peaks indicative of the leading and trailing edges of said pulse width modulated signals, said pulse peaks being interspersed with intervals of no signal, the method of suppressing spurious noises during said intervals of no signal comprising the steps of reproducing said train of recorded pulse peaks, superimposing a high frequency oscillatory signal onto said train of reproduced pulse peaks, amplifying and limiting the combined signals, selectively separating the said pulse peaks from said oscillatory signals, and applying said separated pulse peaks as control signals to a signal reconstituting circuit to reconstruct signals corresponding to said pulse width modulated signals.

2. In a data handling system of the type wherein data is encoded as spaced pulses and represented as a train of pulse peaks indicative of the leading and trailing edges respectively of said spaced pulses, said pulse peaks being interspersed with intervals of no signal, signal translating means including means for suppressing spurious noises during said intervals of no signal, said translating means comprising a source of high frequency oscillatory signals, means for superimposing signals from said source upon said train of pulse peaks, a high-gain limiting amplifier, means for applying the combined signals to said amplifier whereby to amplify and clip said combined signals, means for selectively separating said pulse peaks from the output of said amplifier, and means responsive to said separated pulse peaks for reconstituting said spaced pulses.

3. The invention as set forth in claim 2 wherein said means for selectively separating said pulse peaks from the output of said amplifier comprises a low-pass filter for filtering out said high frequency signal.

4. The invention as set forth in claim 2 wherein said means for selectively separating said pulse peaks from the output of said amplifier comprises a low-time constant differentiating means whereby only the pulse peaks reach a predetermined level.

5. The invention as set forth in claim 2 wherein said means for selectively separating said pulse peaks from the output of said amplifier comprises low bandwidth stages in said limiting amplifier.

6. In a data handling system of the type wherein data is encoded as pulse width modulated signals and which are represented as a train of pulse peaks indicative of the leading and trailing edges respectively of said pulse width modulated signals, said pulse peaks being interspersed with intervals of no signal, signal translating means including means for suppressing spurious noises during said intervals of no signal, said translating means comprising a source of high frequency oscillatory signals, means for superimposing oscillatory signals from said source onto said train of pulse peaks, a high gain limiting amplifier, means for applying the combined signals to said amplifier whereby to amplify and clip said combined signals, means for selectively separating said pulse peaks from the output of said amplifier, said last mentioned means including a low-pass filter for filtering out said high frequency signal and passing said pulse peaks, and means responsive to said separated pulse peaks for reconstituting said pulse width modulated signals, said responsive means including an Eccles-Jordan trigger circuit.

References Cited in the file of this patent

UNITED STATES PATENTS

| | | |
|---|---|---|
| 2,116,501 | Armstrong | May 10, 1938 |
| 2,153,202 | Nichols | Apr. 4, 1939 |
| 2,166,995 | Koch | July 25, 1939 |
| 2,507,730 | Mitchell | May 16, 1950 |

OTHER REFERENCES

Synchronized Oscillators as F.-M. Receiver Limiters, by Carnahan and Kalmus. Electronics, August 1944, pp. 108–111, 332, 334, 336, 338, 340 and 342.